Aug. 22, 1939.　　　F. JÄHNE　　　2,170,371
APPARATUS FOR TESTING MAGNETIZABLE WORKPIECES
Filed Jan. 8, 1935
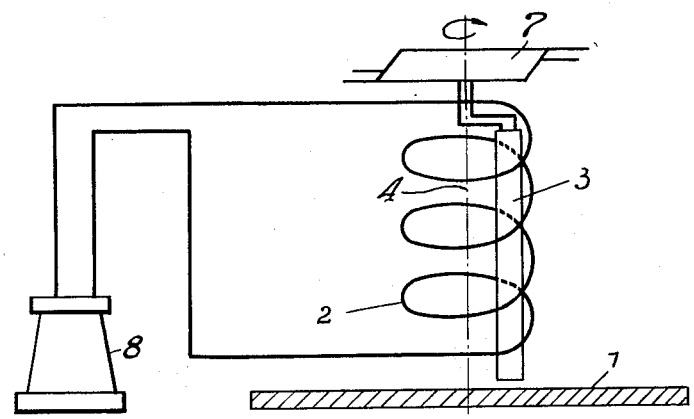
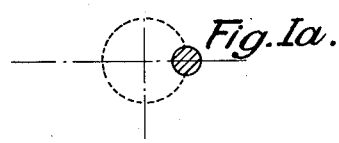
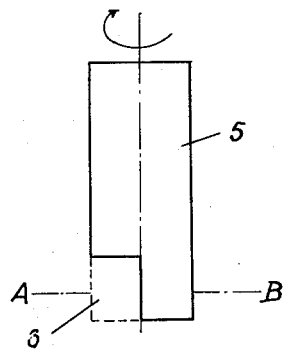
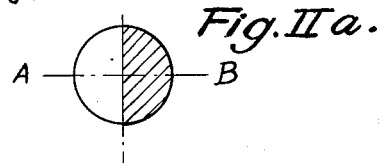
INVENTOR:
Friedrich Jähne,
BY
Potter, Pierce & Scheffler
ATTORNEYS Patented Aug. 22, 1939

2,170,371

UNITED STATES PATENT OFFICE 2,170,371

APPARATUS FOR TESTING MAGNETIZABLE WORKPIECES

Friedrich Jähne, Frankfort-on-the-Main, Germany, assignor to I. G. Farbenindustrie Aktiengesellschaft, Frankfort-on-the-Main, Germany Application January 8, 1935, Serial No. 904
In Germany January 8, 1934

5 Claims. (Cl. 175—183)

The present invention relates to apparatus for detecting inhomogeneities in magnetizable work pieces, particularly in welded seams.

In U. S. Patent No. 2,103,224, issued Dec. 21, 1937, in the name of Eugen Schweitzer and Siegfried Kiesskalt there is described a method of detecting inhomogeneities in magnetizable work pieces, particularly in welded seams, which method consists in producing, at the inhomogeneous part of the piece to be tested, a current in a testing coil in the following manner: the iron core within the stationary testing coil is caused to oscillate in a direction perpendicular to the plane of turn of the testing coil. By this method the normal component of force may be measured directly by means of a listening apparatus, for instance a telephone, a loud-speaker or an earphone.

Now I have found that inhomogeneities or any defective parts may be indicated by causing a ferro-magnetic core to move in an eccentric manner within the stationary coil in a direction parallel with the surface of the piece, i. e. to oscillate or to rotate therein so that its axis is disposed eccentrically with respect to the axis of the said coil, the coil being connected to a listening device. The voltage induced in the stationary coil is then proportional with the differential quotient of the normal component, with reference to the place. An arrangement of this kind, furthermore, has the particular advantage that the dimensions of the core and the coil may be relatively low. In order not to have to provide an unutilized space in the interior of the coil in the case of large amplitudes of oscillation of the core, the coil may be mounted in a movable manner between rubber pads so that it takes up only an infinitesimal fraction of the rotation energy of the core. It is particularly advantageous if the core in the coil does not oscillate to and fro, but is mounted eccentrically at a rotating axis. The invention is illustrated on the accompanying drawing in which Fig. I is a diagrammatic elevation of one embodiment of my appartus;

Fig. I$a$ is a bottom plan of Fig. I;

Fig. II is an elevation of a modified form of core, and

Fig. II$a$ is a bottom plan of Fig. II.

Referring to Fig. I, 1 is the surface of the work piece, 2 is the stationary testing coil and 3 is a ferro-magnetic core which rotates round the axis of rotation 4 and is mounted in an eccentric manner. The coil 2 is connected with a listening device 8.

In the arrangement which is illustrated in Fig. II there is used a round core 5 half of which has been ground down. In order to avoid eddy current losses in the case of a high number of revolutions, the core may be subdivided in known manner.

For avoiding additional mechanical stress of the rotating shaft, the part of the core which is not filled up with ferro-magnetic material is preferably replaced by a non-magnetic material, as illustrated by part 6 of Fig. II. For this purpose, there may, for instance be chosen brass or an insulating material the weight of which corresponds as far as possible to that of a ferromagnetic body having the same size.

The rotating core is driven with particular advantage by mechanical means, for instance by a compressed air motor 7, as shown in Fig. I, in order to avoid any electric and magnetic disturbances.

If an oscillating core is used, its frequency is preferably brought in accordance by a mechanical means with the frequency of the driving system.

I claim:

1. An apparatus for detecting inhomogeneities in magnetizable work pieces, particularly in welded seams, comprising a ferro magnetic core encircled by a coil, mechanical means for moving said core in an eccentric manner and a listening device connected to said coil which listening device indicates the voltage induced in the coil if the coil passes inhomogeneities in the work piece parallel to the surface of which it is moved.

2. An apparatus for detecting inhomogeneities in magnetizable work pieces, particularly in welded seams, comprising a ferro magnetic core encircled by a coil, mechanical means for causing said core to oscillate in an eccentric manner and a listening device connected to said coil which listening device indicates the voltage induced in the coil if the coil passes inhomogeneities in the work piece parallel to the surface of which it is moved.

3. An apparatus for detecting inhomogeneities in magnetizable work pieces, particularly in welded seams, comprising a ferro magnetic core encircled by a coil and having its axis disposed eccentrically with respect to the axis of said coil and mechanical means for rotating said core and a listening device connected to said coil which listening device indicates the voltage induced in the coil if the coil passes inhomogeneities in the work piece parallel to the surface of which it is moved.

4. An apparatus as defined in claim 3 wherein the mechanical means for rotating the core is a compressed air motor.

5. An apparatus for detecting inhomogeneities in magnetizable work pieces, particularly in welded seams, comprising a ferro-magnetic core encircled by a coil, mechanical means for moving said core to cause the center of the magnetic field of said core to move in an eccentric manner, and a listening device connected to said coil, which listening device indicates the voltage induced in the coil if the coil passes inhomogeneities in the work piece parallel to the surface of which it is moved.

FRIEDRICH JÄHNE.